United States Patent
Jawaharlal et al.

(10) Patent No.: US 10,756,962 B2
(45) Date of Patent: Aug. 25, 2020

(54) SYSTEM AND METHOD TO DEFINE INTERNET CONTROL RULES IN WI-FI BASED ON LAYOUT

(71) Applicant: International Business Machines Corporation, Armonk, NY (US)

(72) Inventors: Samuel Mathew Jawaharlal, Chennai (IN); Sarbajit K. Rakshit, Kolkata (IN); Sathya Santhar, Chennai (IN); Balamurugaramanathan Sivaramalingam, Ramanathapuram (IN)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 15/671,373

(22) Filed: Aug. 8, 2017

(65) Prior Publication Data
US 2019/0052523 A1   Feb. 14, 2019

(51) Int. Cl.
*H04L 12/24* (2006.01)
*H04L 29/06* (2006.01)
(Continued)

(52) U.S. Cl.
CPC ............. *H04L 41/08* (2013.01); *H04L 12/28* (2013.01); *H04L 12/282* (2013.01); *H04L 41/22* (2013.01);
(Continued)

(58) Field of Classification Search
CPC ..... H04L 41/08; H04L 41/22; H04L 63/0263; H04L 63/107; H04L 63/20; H04W 48/08
See application file for complete search history.

(56) References Cited

U.S. PATENT DOCUMENTS 8,902,769 B1 * 12/2014 Dehghan ................. H04L 43/08
370/252
9,363,670 B2   6/2016 Dougherty et al.
(Continued)

FOREIGN PATENT DOCUMENTS

WO   2004059912   7/2004
WO   2014113882   7/2014

OTHER PUBLICATIONS

Cisco "Wi-Fi Location-Based Services 4.1 Design Guide" updated Jan. 30, 2014; Chapter: Best Practices—Location—Aware WLAN Design Considerations; http://www.cisco.com/c/en/us/td/docs/solutions/Enterprise/Mobility/WiFiLBS-DG/wifich5.html; 75 pages.
(Continued)

*Primary Examiner* — Todd L Barker
(74) *Attorney, Agent, or Firm* — Aaron N. Pontikos (57) ABSTRACT

The present disclosure is a method for method for applying control rules to a mobile device in an environment. The method comprises the first step of loading a virtual boundary of an environment onto a Wi-Fi router, which is wirelessly connected to an access point in the environment. Such virtual boundary can be a layout of a home, office, or other building. Next, the method includes the steps of assigning a control rule to the virtual boundary, receiving a data packet at the Wi-Fi router from a Wi-Fi enabled mobile device in the virtual boundary and connected to the access point, and applying the control rule to the data packet.

9 Claims, 7 Drawing Sheets

(51) Int. Cl.
*H04L 12/28* (2006.01)
*H04W 12/08* (2009.01)
*H04W 48/08* (2009.01)
*H04W 84/12* (2009.01)

(52) U.S. Cl.
CPC ........ *H04L 63/0263* (2013.01); *H04L 63/107* (2013.01); *H04W 12/08* (2013.01); *H04L 41/5019* (2013.01); *H04L 63/20* (2013.01); *H04L 2012/2841* (2013.01); *H04W 48/08* (2013.01); *H04W 84/12* (2013.01)

(56) References Cited

U.S. PATENT DOCUMENTS

| | | |
|---|---|---|
| 9,398,558 B2 | 7/2016 | Morgan et al. |
| 9,692,784 B1* | 6/2017 | Nenov ................ H04L 63/1458 |
| 9,977,843 B2* | 5/2018 | Dahlen .................. G06F 17/50 |
| 2013/0058274 A1 | 3/2013 | Scherzer et al. |
| 2014/0206389 A1* | 7/2014 | Aldana ................ H04W 4/021 |
| | | 455/456.2 |
| 2016/0084646 A1* | 3/2016 | Chen ....................... G01S 5/021 |
| | | 702/150 |
| 2018/0063082 A1* | 3/2018 | Nenov ................ H04L 63/0236 |

OTHER PUBLICATIONS

Mitchell, Bradley; "Gallery of Home Network Diagrams"; updated Apr. 7, 2017; https://www.lifewire.com/home-network-diagrams-4064053; 7 pages.

Villinger, Sandro; "How to Boost Your Home Wi-Fi Signal" Jan. 22, 2015; https://www.avg.com/en/signal/boost-home-wi-fi-signal-strength; 17 pages.

* cited by examiner

SYSTEM AND METHOD TO DEFINE INTERNET CONTROL RULES IN WI-FI BASED ON LAYOUT

BACKGROUND

The present invention relates generally to mobile device communication in a wireless network, and more particularly to applying rules to data packets from connected mobile devices based on building layout and 3-D spatial coordinates.

"Wi-Fi" is a term for wireless local area networking (WLAN) technology, which is defined by the Electrical and Electronics Engineers ("IEEE") 802.11b standards. Devices capable of utilizing Wi-Fi technology include computers, such as laptops, desktops, gaming consoles, smartphones, tablets, and other smart devices. A Wi-Fi network is usually established as a wireless ad hoc network or with wireless "access points." The ad hoc network is a peer-to-peer layout where two devices communicate directly when they are in range, similar to Bluetooth connections. Wireless access points are devices that serve as a hub, which creates a WLAN, and projects a Wi-Fi signal in a designated area, such as an office space or building. Wi-Fi devices connect to a wired network (usually a router) via the access points. In some instances, the access point may be integrated into the router.

Wireless access points have many advantages in comparison to other Wi-Fi technology. In particular, an access point can provide a Wi-Fi signal in a dead spot, a room or space out of range of the router. To accomplish this, an access point is placed in a dead spot and connected directly to a wired Ethernet connection. In comparison, a range extender only reaches an existing Wi-Fi network and must be placed where the Wi-Fi signal from the router is strong. Another advantage of an access point is that it provides a wireless connection for multiple wireless devices. Access points allow for over 60 simultaneous connections. While range extenders increase the range of the Wi-Fi signal from the router, the available bandwidth does not increase and thus, the number of connected device is more limited.

To connect to an access point, a computer or other smart device can actively send a "probe" to be received by the access point. Alternatively, the device can more passively scan for a "beacon" sent periodically by the access point. Once the access point recognizes the device, an authentication process occurs. If the authentication is verified, an association process occurs, which sets up a logical session for transmitting higher-layer protocols and data to the device.

Currently, many homes, office spaces, restaurants, hotels, and other large buildings utilize wireless access points. Although mobile devices may be within range to connect to the access point, many wireless networks have rules for connecting to the access point. In addition, once a device is connected, the wireless network may have rules controlling access to content. However, the majority of control rules used today are static rules. These static rules operate independent of the type of mobile device, user of the mobile device, and situation at present. Thus, static rules are undesirable in an environment, such as a home, where you have many different users accessing mobile devices in many different situations.

Therefore, there is a need for a system and method for dynamically applying access rules to mobile devices in an environment based on parameters such as a mobile device ID or location data.

SUMMARY

The present invention is a method to define Internet control rules in Wi-Fi based on layout. In one embodiment, the method includes the first step of loading a virtual boundary of an environment onto a Wi-Fi router, which is wirelessly connected to an access point in the environment. Such virtual boundary can be a layout of a home, office, or other building. Next, the method includes the steps of assigning a control rule to the virtual boundary, receiving a data packet at the Wi-Fi router from a Wi-Fi enabled mobile device in the virtual boundary and connected to the access point, and applying the control rule to the data packet.

In another embodiment, the invention is a computer program product for controlling and restricting access to Internet-based content based on location. The computer program includes a computer readable storage medium having program instructions embodied therewith, wherein the computer readable storage medium is not a transitory signal per se. The program instructions are readable by a computer to cause the computer to perform a method. The method includes the steps of loading a layout of an environment onto a Wi-Fi router, transmitting location and direction information of each virtual boundary of the layout with respect to an access point to the Wi-Fi router, assigning control rules to a virtual boundary of the layout, receiving a location and a data packet at the Wi-Fi router from a Wi-Fi enabled mobile device connected to the access point, associating the location with the virtual boundary of the layout, applying the control rules assigned to the virtual boundary of the layout to the data packet from the Wi-Fi enabled mobile device, and transmitting the data packet to the Wi-Fi enabled mobile device.

In an alternative embodiment, the method for controlling and restricting access to Internet-based content based on location includes the steps of: (i) processing, at a Wi-Fi router, a layout of an environment having a first virtual boundary and a second virtual boundary; (ii) assigning, at the Wi-Fi router, a first control rule to the first virtual boundary and a second control rule to the second virtual boundary; (iii) receiving, at the Wi-Fi router, a data packet with location data from a Wi-Fi enabled mobile device connected to an access point; (iv) associating the location data with the first virtual boundary of the layout; and (v) applying the first control rule to the data packet from the Wi-Fi enabled mobile device. The method may also include the steps of transmitting the data packet to the Wi-Fi enabled mobile device, associating the location data with the second virtual boundary of the layout, and applying the second control rule to the data packet from the Wi-Fi enabled mobile device.

BRIEF DESCRIPTION OF THE DRAWINGS

The present invention will be more fully understood and appreciated by reading the following Detailed Description in conjunction with the accompanying drawings, in which.

DETAILED DESCRIPTION

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
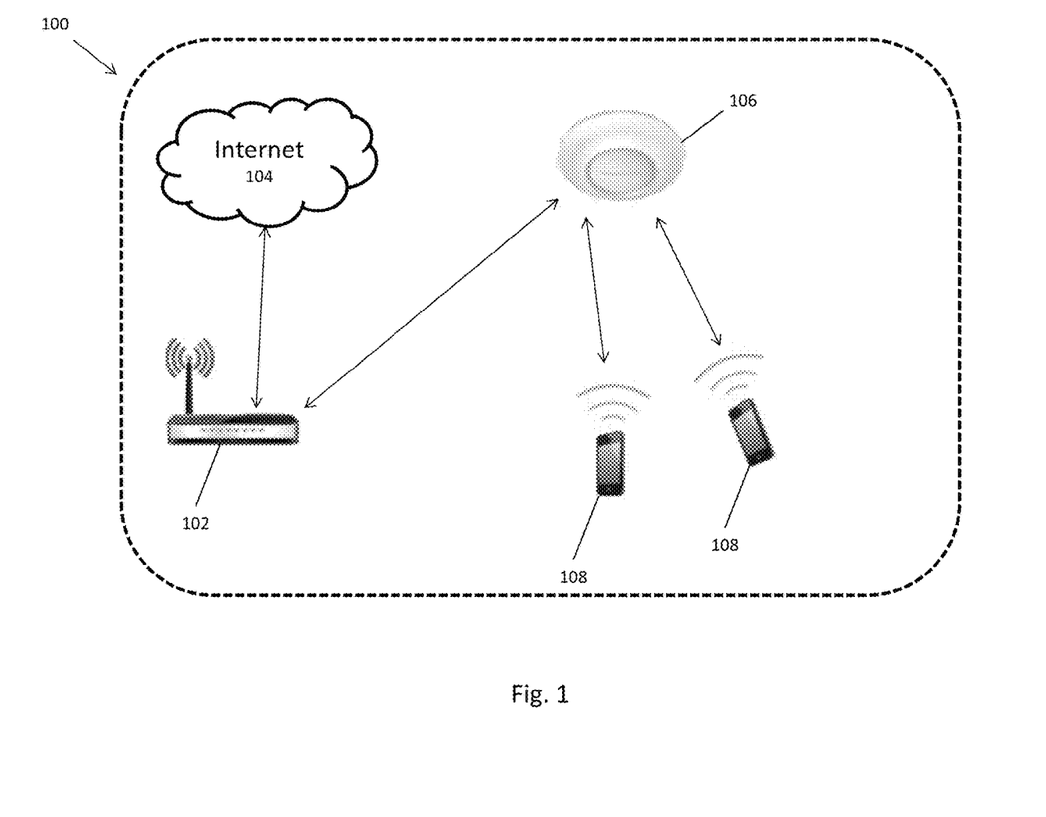
FIG. 1 is a diagram of a non-limiting illustrative embodiment of the system.

Referring again to the drawings, wherein like reference numerals refer to like parts throughout, there is shown in FIG. 1 a diagram of a non-limiting illustrative embodiment of the system 100. As shown in the depicted embodiment, the system 100 is a Wi-Fi network comprising a Wi-Fi router 102 that is connected to the Internet 104, and is in communication with a wireless access point 106 and connected devices 108. Connected devices 108 may be smartphones, laptops, and other computing devices. The system 100 may be implemented in an environment with defined boundaries, such as a building, office space, home, or other like structure. For example, in an office building, the system 100 may comprise a main Wi-Fi router 102 on the ground floor and one or more wireless access points 106 providing wireless signals on other floors. That way, employees and other individuals will be connected to the system 100 (i.e., Wi-Fi network) anywhere in the office building.

Figure 2:
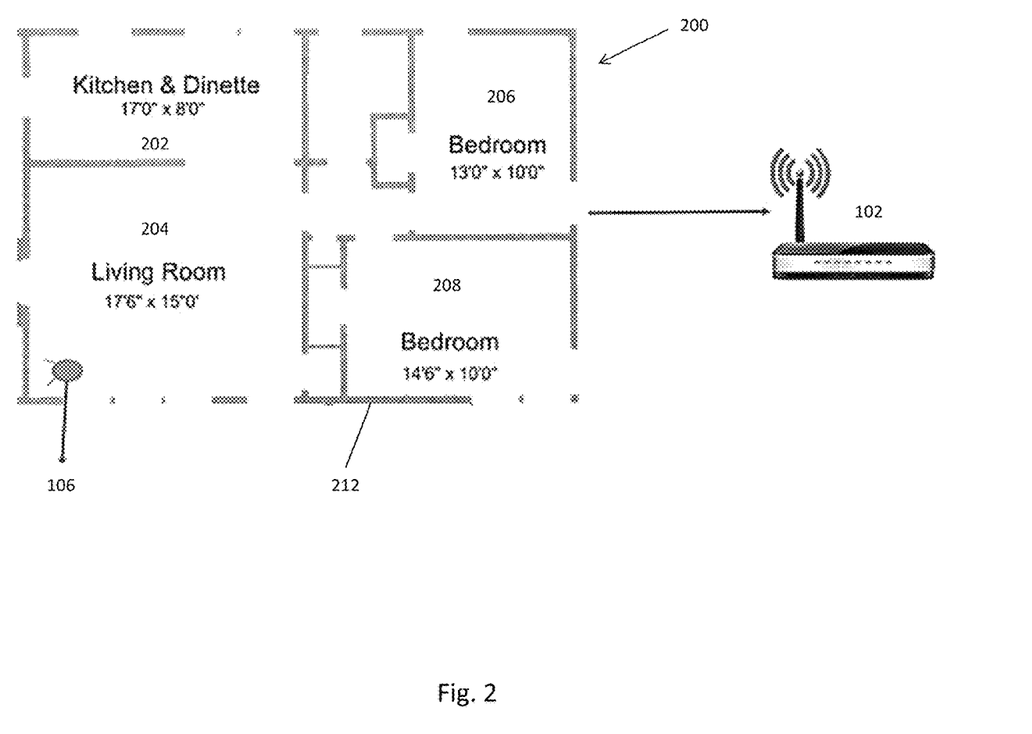
FIG. 2 is a diagram of a non-limiting illustrative embodiment of a layout of a house with the system.

As with an office building, any environment or structure with defined boundaries has a specific layout. A layout is a blueprint or drawing that defines and illustrates the bounds of rooms, walls, and other partitions, often to scale. Turning now to FIG. 2, there is shown a diagram of a non-limiting illustrative embodiment of a layout 200 of a home. In the depicted embodiment, the layout 200 of a home comprises scaled boundaries 212 for a kitchen and dinette area 202, a living room area 204, a first bedroom area 206, and a second bedroom area 208. As shown, the boundaries 212 that make up the layout 200 represent walls between each of the rooms 202, 204, 206, 208. The layout 200 shown in FIG. 2 also depicts the system 100, a Wi-Fi router 102 and access point 106, implemented in the home. The system 100 utilizes the layout 200 to determine the location of a device 108 in the boundaries 212 of the layout 200 and transmit one or more logical rules ("control rules") to the device 108 during a logical session.

Figure 5:
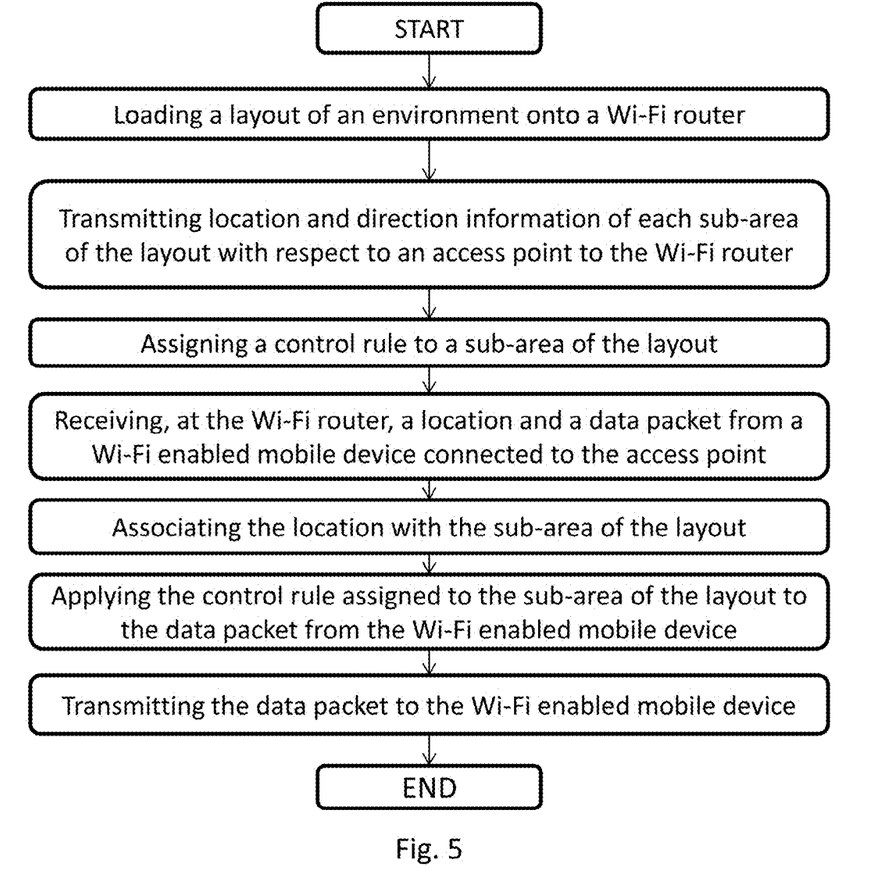
FIG. 5 is a flowchart of a non-limiting illustrative embodiment of a method for controlling and restricting access to Internet-based content based on location.

Referring now to FIG. 5, there is shown a flowchart of a non-limiting illustrative embodiment of a method for controlling and restricting access to Internet-based content based on location. First, a layout 200 comprised of virtual boundaries 212, such as that shown in FIG. 2, is transmitted to the Wi-Fi router 102. In one embodiment, the layout 200 is fed to the router 102 through a connected computing device. For instance, a Wi-Fi computer program, such as Heatmapper, can be used to upload the layout 200 (as understood and appreciated by a person of ordinary skill of the art in conjunction with a review of this disclosure). In an alternative embodiment, the layout 200 is drawn directly in the GUI of the router 102. In another embodiment, the router 102 can track the boundaries 212 of each room 202, 204, 206, 208 in the layout 200 when a laptop or other connected computing device is moved around the house (or other environment). In this embodiment, later rooms and measurements can be labeled on the measured boundary. Ultimately, a layout 200 is transmitted or otherwise uploaded to the Wi-Fi router 102, providing the measurement information for each room 202, 204, 206, 208. Included in the layout 200 is also information regarding the location and direction of each room 202, 204, 206, 208 with respect to the access point 106. The router 102 then processes the layout 200 and monitors each room 202, 204, 206, 208 with respect to its location.

Figure 3:
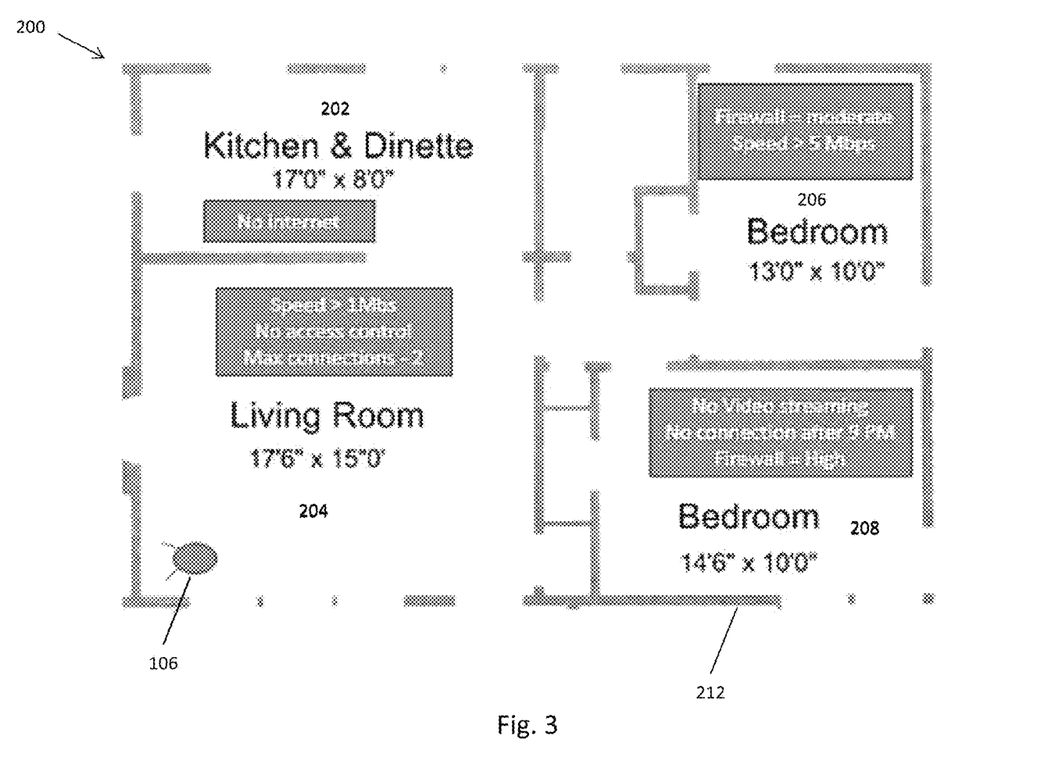
FIG. 3 is a diagram of a non-limiting illustrative embodiment of a layout of a home with access rules for each room of the home.
Figure 4:
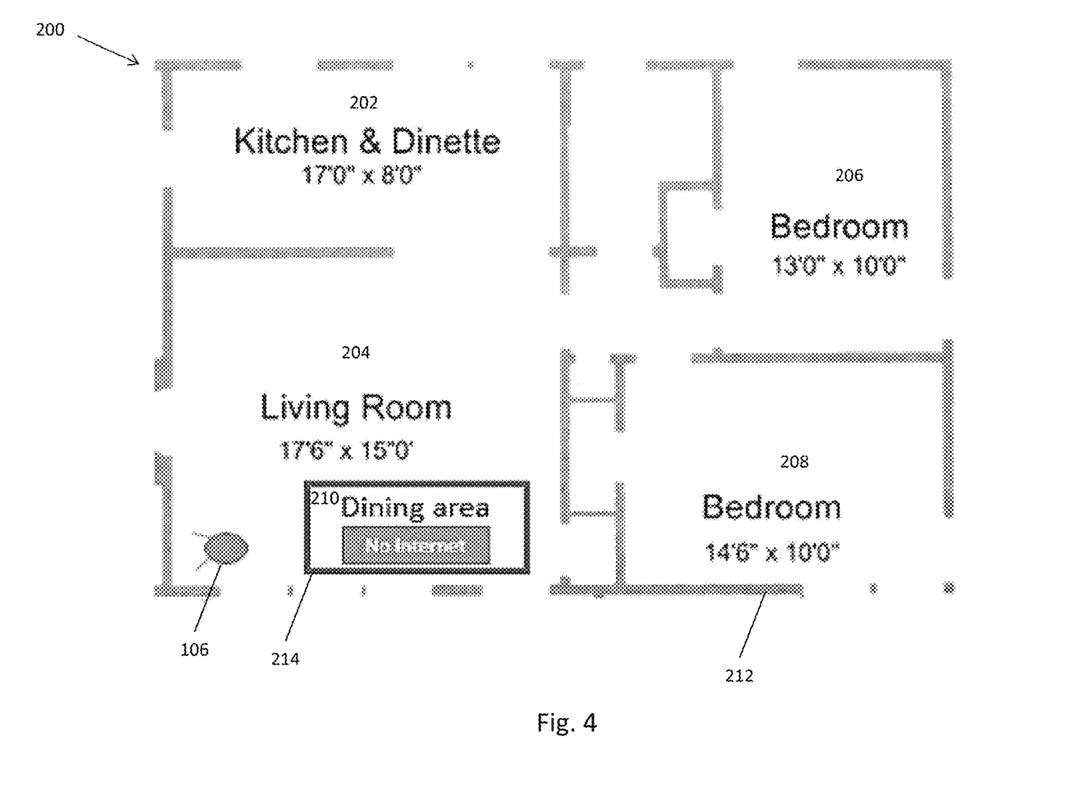
FIG. 4 is a diagram of a non-limiting illustrative embodiment of a layout of a home with access rules for an object in a room.

Before the router 102 loads the layout 200, access control and firewall policies can be incorporated into the layout 200. In an alternative embodiment, the layout 200 is loaded and processed first, and is then edited in the GUI of the router 102 to add the control rules. In such embodiment, the control rules can be changed by the administrator at any time, on demand. Such control rules can be applied to rooms 202, 204, 206, 208 in the layout 200 of a home, as shown in FIG. 3, and to sub-areas/objects 210 within a room 204, such as shown in FIG. 4. Thus, the control rules are applied to locations within a boundary 212 of a room 202, 204, 206, 208, or locations within a boundary 214 surrounding an object 210, such as a dining table. The applied control rules can be of any form, including, but not limited to: speed, data packets SLAs, maximum number of connections allowed, firewall policies, COS applied, and packet loss.

Figure 6:
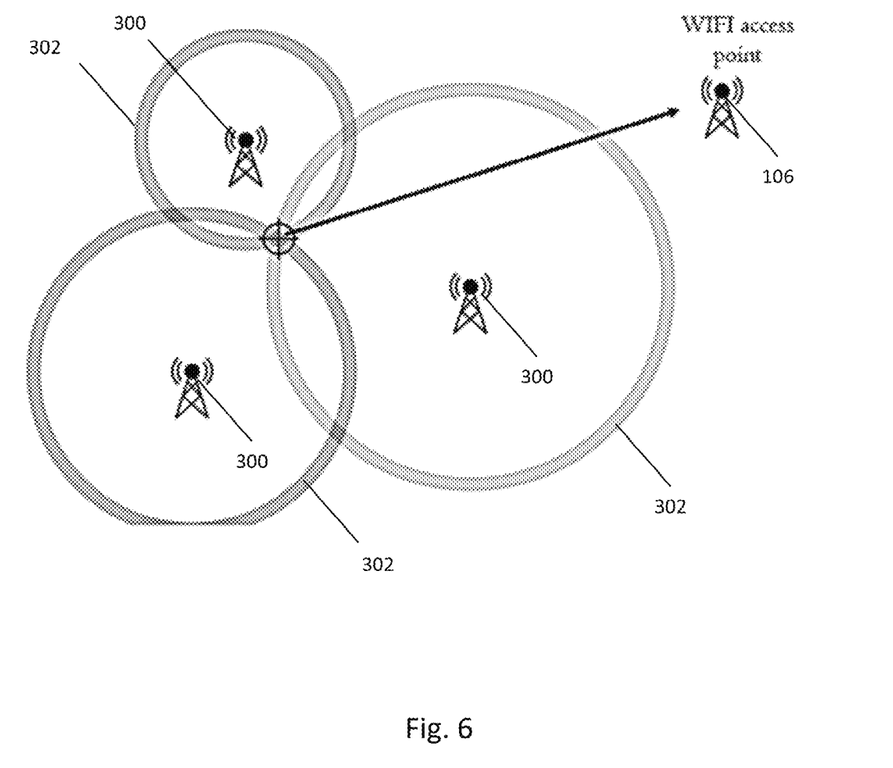
FIG. 6 is a diagram of a non-limiting illustrative embodiment of the location of a device determined using micro-array antennas.

When any Wi-Fi-enabled device 108 connects to the access point 106 within the house or other environment, the connected device 108 transmits its 3D spatial coordinates to the router 102. In one embodiment, the 3D spatial coordinates are obtained from GPS data from the connected device 108. In another embodiment, according to U.S. patent application Ser. No. 10/335,048, which is entirely incorporated herein by reference, the router 102 receives 3D spatial coordinates of a device 108 with respect to the boundaries 212, 214 of the layout 200 using directional antenna arrays to calculate angles to the connected device 108 (as should be understood and appreciated by a person of ordinary skill in the art in conjunction with a review of this disclosure). Specifically, the location of the device 108 connecting to the access point 106 can be identified using 3 micro-array antennas 300 with each antenna 300 first calculating the distance between the device 108 and its own location, and second, correlating all three coverages using triangulation, as illustrated in FIG. 6. In determining the location of the device 108, the access point 106 can also act as the third transceiver.

Based on the location of the connected device 108 determined by the router 102, the system 100 applies control rules to packets of data broadcasted from such devices 108. When the location of a connected device 108 is in a particular room 202, 204, 206, 208 in the layout 200, the system 100 retrieves the specific control rules correlated to the boundaries 212 for that room 202, 204, 206, 208 and applies those control rules to the data packet broadcasted by the connected device 108. Thus, as stated above, the control rules applied to the connected device 108 are room-specific. In some embodiments, the control rules can be applied based on the location of a connected device 108 within a boundary 214 that defines a sub-area or surrounds an object 210 within a particular room 204.

Referring to FIG. 3, there is shown a diagram of a non-limiting illustrative embodiment of a layout 200 of a home with rules for each room 202, 204, 206, 208. In the depicted embodiment, each room 202, 204, 206, 208 has its own set of control rules that can be changed by the administrator at any time. As shown, a kitchen & dinette room 202 may have a corresponding control rule where there is no Internet provided. In another example, the first bedroom 206, such as a child's bedroom, may have corresponding control rules where there is no video streaming, no Internet connection after 9:00 PM EST, and a high firewall policy. On the other hand, the second bedroom 208, such as an adult's bedroom, may have a moderate firewall policy and allow speed greater than 5 Mbps. In the final example shown in FIG. 3, the living room 204 may have corresponding control rules where there is no access control, a set number for maximum connections, and a speed greater than 1 Mbps.

Referring now to FIG. 4, there is shown a diagram of a non-limiting illustrative embodiment of a layout 200 of a home with control rules for an object 210 in a room 204. As stated above, the control rules can also be applied to boundaries 214 defining a sub-area and surrounding an object 210 within a particular room 204. The embodiment depicted in FIG. 4 shows a boundary 214 surrounding a dining table (or dining sub-area) 210 in the living room 204. The control rule applied to the locations within the boundary 214 surrounding the dining table 210 is a rule that does not allow Internet access. This is beneficial when, for instance, parents would like have a meal at the dining table (or dining sub-area) 210 without the distraction of mobile devices 108 with access to Internet 104 for their children or other guests.

As a Wi-Fi-enabled mobile device 108 moves to different locations within the home (or other environment), the Wi-Fi router 102 monitors the movements of the mobile device 108 and applies new control rule settings to the mobile device 108 accordingly. In one embodiment, there is also an overriding rule set that is device-specific. In some embodiments, the packet received from the connected device 108 may have an ID or other identifying information that can be correlated to specific control rules. For example, a child's mobile device may have a strict firewall enabled in his or her bedroom, as shown in FIG. 3, while a parent's mobile device will have not have any firewall enabled, even when located within the child's bedroom.

Figure 7:
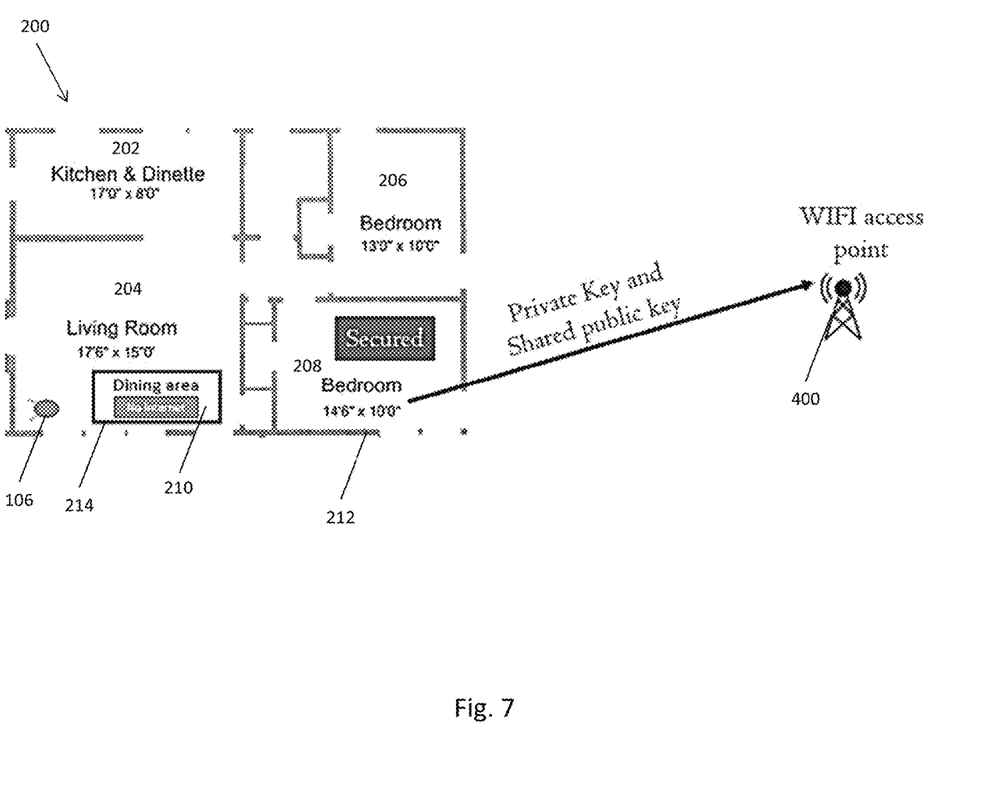
FIG. 7 is a diagram of a non-limiting illustrative embodiment of device encryption defined in a layout.

In some embodiments, the location-based Wi-Fi service need not be restricted to the type and quality of service alone, but may also extend to providing authentication-based services. For example, as shown in FIG. 7, when a device 108 is connected from a child's bedroom 208, the Wi-Fi access can be secured by an authentication mechanism whereas the connection can be open when accessed from the living room 204. Additionally, all packets originating from a specific location within the layout 200 can be encrypted by the router 102 when the device 108 connects to an access point 400 outside the layout 200 (i.e., outside the building or home). Alternatively, the packets can be encrypted by the mobile device 108, which would be defined in the layout 200.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A method for applying control rules to a mobile device in an environment, comprising the steps of:
   importing a layout of an environment to a Wi-Fi computer program on a computing device;
   surveying the environment with the computing device having the Wi-Fi computer program to create a virtual boundary of the environment;
   loading the virtual boundary of the environment onto a Wi-Fi router, the Wi-Fi router wirelessly connected to an access point in the environment;
   assigning a control rule to the virtual boundary of the layout;
   receiving, at the Wi-Fi router, a data packet transmitted from a Wi-Fi enabled mobile device in the virtual boundary and connected to the access point; and
   applying the control rule to the data packet transmitted from the Wi-Fi enabled mobile device to the Wi-Fi router based on the Wi-Fi enabled mobile device being located within the
   virtual boundary and an ID sent by the Wi-Fi enabled mobile device to the Wi-Fi router, wherein the control rule regulates the transmission of the data, packet by the Wi-Fi router based on at least one of a firewall policy and a class of service (COS); and
   wherein the control rule may be overridden based on the received ID; and
   wherein additional control rules may be dynamically changed by an administrator utilizing a graphical user interface (GUI).

2. The method of claim 1, wherein the layout of the environment is a building layout.

3. The method of claim 1, further comprising the steps of:
   receiving 3D spatial coordinates from the Wi-Fi enabled mobile device; and
   determining, based at least in part on the 3D spatial coordinates, if the Wi-Fi enabled mobile device is within the virtual boundary.

4. A method for controlling and restricting access to Internet-based content based on location, comprising the steps of:
   importing a layout of an environment to a Wi-Fi computer program on a computing device;
   surveying the environment with the computing device having the Wi-Fi computer program to create a first virtual boundary and a second virtual boundary of the environment;
   loading the first virtual boundary and the second virtual boundary of the environment onto a Wi-Fi router;
   assigning, at the Wi-Fi router, a first control rule to the first virtual boundary and a second control rule to the second virtual boundary;
   receiving, at the Wi-Fi router, a data packet with location data from a Wi-Fi enabled mobile device connected to an access point;
   associating the location data with the first virtual boundary of the layout; and
   applying the first control rule to the data packet transmitted from the Wi-Fi enabled mobile, device to the Wi-Fi router based on the Wi-Fi enabled mobile device being located within the virtual boundary and an ID sent by the Wi-Fi enabled mobile device to the Wi-Fi router, wherein the control rule regulates the transmission of the data packet by the Wi-Fi router based on at least one of a firewall policy and a class of service (COS); and
   wherein the first control rule and the second control rule may be overridden based on the received ID; and
   wherein additional control rules may be dynamically changed by an administrator utilizing a graphical user interface (GUI).

5. The method of claim 4, further comprising the step of transmitting the data packet to the Wi-Fi enabled mobile device.

6. The method of claim 4, further comprising the steps of:
   associating the location data with the second virtual boundary of the layout; and
   applying the second control rule to the data packet from the Wi-Fi enabled mobile device.

7. The method of claim 6, wherein the step of associating the location data with the second virtual boundary of the layout occurs when the Wi-Fi enabled mobile device moves from the first virtual boundary to the second virtual boundary.

8. The method of claim 4, further comprising the step of calculating 3D spatial coordinates from the location data.

9. A computer implemented method comprising:
receiving region definition data including information indicative or three dimensional spatial boundaries that define a plurality of three dimensional subspaces within a building structure;
receiving a plurality of maximum permissible number-of-connection values respectively corresponding to the plurality of three dimensional subspaces;
receiving, from a user device and by a wireless network implementation device, a request to connect the user device to a communication network through the wireless network implementation device and an ID;
receiving location data including information indicative of a location of the user device in three dimensional space;
determining that the user device is located in a first three dimensional subspace of the plurality of three dimensional subspaces based, at least in part, upon: (i) the region definition data and the location data;
determining a current number-of-connection values corresponding to the number of devices located in the first three dimension subspace that are currently connected to the communication network through the wireless network implementation device;
determining that the current number-of-connection values is equal to or greater than the maximum permissible number-of-connections value or the first three dimensional subspace; and
communicating, from the wireless network implementation device and to the user device, that the user device cannot be connected to the communication network through the wireless network implementation device; and wherein the maximum permissible number-of-connection value is associated with a control rule that may be overridden by utilizing the ID received from the user device; and
wherein additional control rules may be dynamically changed by an administrator utilizing a graphical user interface (GUI).

* * * * *